June 13, 1961 R. M. MINOCK 2,988,053
INSECTICIDE APPLICATOR
Filed Aug. 22, 1958

INVENTOR.
ROBERT M. MINOCK
BY
Philip H. Sheridan
ATTORNEY

2,988,053
INSECTICIDE APPLICATOR
Robert M. Minock, 225 E. Maple Ave., Denver, Colo.
Filed Aug. 22, 1958, Ser. No. 756,674
4 Claims. (Cl. 119—159)

This invention relates to a livestock insecticide applicator, and more particularly relates to the application of insecticide in powdered or dust form onto the skin surface of an animal.

In the application of insecticide and the like to animals, it is customary to provide some means operative to apply then immediately work or comb insecticide material into the skin. In many animals, such as, cattle or sheep it is often preferred to apply the insecticide in powered instead of liquid form because it will not actually soak through the skin of the animal. In the use of powdered insecticide however it is important to apply and comb the insecticide thoroughly and evenly into direct contact with the skin for the most effective and lasting results. This, of course, become especially difficult if the animals have dense, fleecy or kinky hair, and it is neccessary in order to accomplish the above in the desired manner that the skin surface be exposed for the direct application of the powdered insecticide onto the skin and further, after applying insecticide, to make it possible to work and comb the insecticide into the skin surface.

In accordance with the present invention, it is proposed to make possible the application and combing of the insecticide into the skin of the animal in a single, continuous combing operation and, most important, in such a way that the insecticide is released onto, or in the immediate vicinity of the skin in preparation for the combing or rubbing operation. It is further proposed to accomplish the same in a simple manual operation, and to assure most effective application of the insecticide for various types of animals, notwithstanding the density of the hair covering the skin and regardless of the direction in which the applicator is moved over the body of the animal.

Accordingly it is a primary object of the invention to provide a way of applying powdered insecticide onto the skin of an animal in which the insecticide is released and uniformly distributed into direct contact with the skin of the animal prior to combing or otherwise working the insecticide into the skin surface.

It is another object of the present invention to provide means for parting or otherwise exposing the skin of an animal for the direct and even distribution of powdered insecticide thereto, together with means to comb the insecticide into firm contact with the skin, and to do so in a single, continuous operation.

It is a further object of the present invention to provide a livestock insecticide applicator in which provision is made for parting the hair of the animal, depositng powdered insecticide over the skin so exposed and rubbing the insecticide into the skin in a single coordinated operation which can be carried out continuously and evenly over the body of the animal either by stroking or otherwise advancing the applicator in any desired direction with respect to the normal disposition of the hair on the animal.

It is still a further object of the present invention to make provision for a livestock applicator incorporating adjacent-but spaced rows of parting means together with a series of openings for releasing insecticide in powdered form between the parting means, the elements being so arranged as to successively expose the skin surface, apply insecticide onto the skin so exposed and to work the insecticide into the skin as the applicator is advanced over the body of the animal.

Other objects and advantages will become more apparent from the following description, the accompanying drawings and the appended claims. In the drawings:

Figure 1:
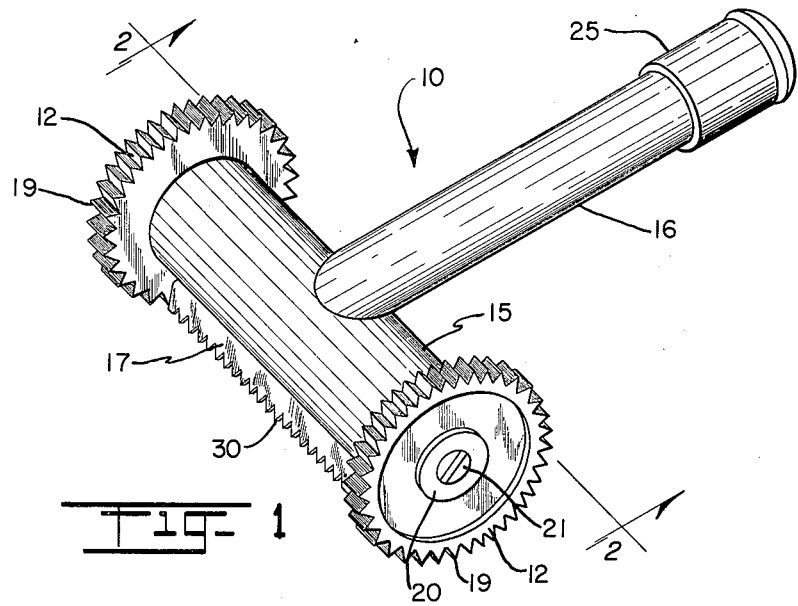
FIGURE 1 is a perspective view of a preferred form of insecticide applicator in accordance with the present invention.
Figure 2:
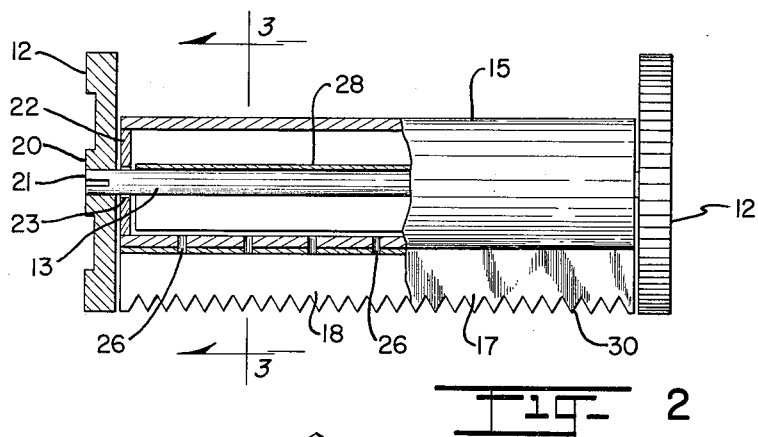
FIGURE 2 is a front view, with parts broken away, taken on line 2—2 of FIGURE 1.

Referring to the drawings, an illustrative form of insecticide applicator is shown at 10 broadly comprised of wheels 12, shaft 13 interconnecting the wheels, a container or dispenser 15 journaled to the shaft 13, a handle 16 extending rearwardly from the dispenser 15 and parting means defined by a pair of comb members 17 and 18 depending downwardly from the underside of the dispenser 15. In the preferred form, the applicator 10 of the present invention is operated by hand and the parts making up the applicator are composed preferably of a rigid metallic material, although it will be evident that other suitable means and materials may be employed in the operation and construction of the applicator, respectively.

In order to permit stroking or advancing of the applicator in substantially any desired manner and direction, the wheels 12 define rollers having gripping surfaces 19 of a generally sawtooth or serrated form, together with a hub 20 for receiving ends 21 of the shaft 13 with the ends 20 being upset or otherwise suitably formed for interconnection to the wheels 12 so as to rotate with the wheels 12.

The container 15 is generally tubular or of hollow cylindrical form, and is dimensioned to extend in outer concentric relation over the shaft 13 between the inner surfaces of the wheels 12, the container being of a diameter less than the diameter of the wheels. In order to center and journal the container 15 on the shaft 13, solid circular plates 22 are attached to each end of the container, the plates being provided with openings 23 for receiving the ends of the shaft 13. If desired, bearings, not shown, may be secured in the openings or the openings may be sized merely to loosely receive the shaft 13 so as to permit independent rotation of the wheels 12 with respect to the container 15.

Figure 3:
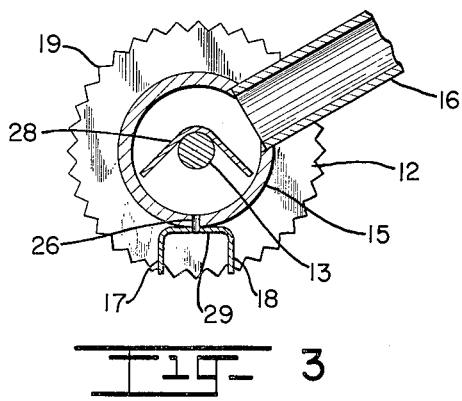
FIGURE 3 is a section view taken on line 3—3 of FIGURE 2.

The handle 16 is attached to the container immediately between the wheels 12 and so as to extend rearwardly from the container. As shown in FIGURE 3, the handle is hollow so as to communicate with the interior of the container at the point of connection therewith and to define an inlet or fill opening for depositing powdered insecticide into the container 15 to any desired level. A suitable plug or end closure may be provided for the handle which, as shown, is in the form of a handle grip 25 disposed over the outer end of the handle 16.

The applicator of the present invention is designed primarily to permit the continuous and rapid application of powdered insecticide over the body of an animal as previously mentioned, and to do so in such a way as to insure thorough and even distribution of the insecticide into direct, firm contact with the skin surface. To this end, apertures 26 are spaced along the underside of the container preferably in an even, single row and at such an angle with respect to the handle 16 as to permit the insecticide to be released in a direction perpendicular to the skin surface when the handle is being advanced by the operator at a convenient angle. In addition, a wiper or blade 28 is connected for movement with the shaft 13 so as to tumble and continually shake the insecticide thereby aiding in the release of the insecticide through the openings 26.

An additional feature of the present invention is the way in which the skin of the animal is exposed for immediate application or release of the insecticide into direct contact therewith, this being accomplished by means of a comb portion connected by weld or other suitable means to the underside of the container 15 so as to extend along the length of the container in a direction transverse to the advancement of the applicator. The comb portion is in the form of a generally channel-shaped member having an attachment plate 29 connected to the underside of the container 15 with openings 30 extending through the attachment plate for alignment with the openings 26 in the container. Extending downwardly from the longitudinal edges of the attachment plate are side plates defining the combs 17 and 18 having teeth 30 formed along the lower edges thereof which as shown are also of generally sawtooth configuration.

The side plates or individual combs are preferably of a length such that the teeth 30 are in line with the ends of the gripping surfaces 19 on the periphery of the wheels so that as the wheels are advanced over the animal's body, the teeth 30 on the leading comb 17 will engage and tend to part or separate the hair adjacent to the skin of the animal, yet at the same time will not unduly interfere with the forward movement of the applicator. In this way, the leading comb, either plate 17 or 18, depending upon the direction of movement of the applicator, will tend to push the hair ahead of it and to separate it by means of the teeth so as to expose the skin of the animal for the application of the insecticide. As the insecticide is released and disposed uniformly over the skin of the animal, the trailing comb will immediately work the insecticide into the skin by the combination combing and rubbing action, since the trailing comb simultaneously folds the hair released by the leading comb over the insecticide applied and forces the insecticide against the skin and also directly contacts the insecticide to work it further into the skin.

In operating the applicator, the handle 16 should be held preferably so that the comb members 17 and 18 extend in a direction perpendicular to the skin as the wheels are advanced over the body. In this connection, the use of spaced comb rows are very helpful in maintaining proper disposition of the handle since the operator is able to easily sense when both combs are contacting the body.

It will be evident that the applicator may either be advanced in a single direction so that the front comb 17 will initially expose the hair, or it may be stroked or reciprocally worked backwards and forwards so that first the front comb 17 then the rear comb 18 will operate alternately to expose the skin for application of the insecticide. However, even though the insecticide is advanced in the same direction as the normal attitude of the hair, the leading comb will nevertheless tend to cause lateral separation of the hair so as to expose the skin.

As a modification, it will be understood of course that a single comb, either 17 or 18, may be employed in spaced relation to the openings in carrying out the application of the insecticide. Of course, with the use of a single comb in spaced relation it is desirable, although not necessary, to work the comb back and forth for most effective application of the insecticide so that the comb will first operate to expose the skin then upon the return stroke will tend to work the insecticide into the skin. Accordingly, and for this reason, the present invention is considered particularly unique and effective in its provision for at least a pair of combs which operate together to accomplish application of the insecticide as described with movement either in a forward direction or forward and backward directions.

Accordingly, while the form of application herein described is of a preferred embodiment of the invention, it is to be understood that the invention is not limited to this precise form, and that changes may be made therein without departing from the scope of the invention as defined by the appended claims.

What is claimed is:

1. A manually operated applicator for treating livestock with powdered insecticide, comprising in combination a pair of rotatable gripping wheels, a shaft interconnecting said wheels, a tubular dispenser journaled on its longitudinal axis to said shaft between said wheels with at least a portion of the surface of said dispenser being spaced inwardly in relation to the outer periphery of said wheels including a row of openings extending the length of said dispenser, a tubular handle secured to said dispenser and forming an inlet for the introduction of insecticide into said dispenser, means disposed within said dispenser for urging the insecticide through said openings as said wheels are rolled over the skin of the livestock, and a generally channel-shaped member attached along the length of said dispenser having an attachment plate including a row of openings aligned with the openings on said dispenser and spaced side plates defining a pair of combs extending downwardly from connection with the longitudinal edges of said attachment plate in a direction generally perpendicular to the skin surface of the livestock, said combs being of a length so as to terminate in line with the outer peripheral edges of said wheels.

2. In an applicator for treating livestock with powdered insecticide having a tubular dispenser provided with a plurality of apertures disposed in a row along the length of said dispenser for releasing the insecticide, together with a handle associated with said dispenser, the combination of a pair of rollers journaled at opposed ends of said dispenser and parting means on said dispenser including a comb-shaped element located adjacent and parallel to the apertures so as to precede the advancement of the apertures over the skin of the animal.

3. In an applicator according to claim 2 wherein said parting means on said dispenser additionally includes a second comb-shaped element located adjacent and parallel to the apertures to follow the advancement of the apertures over the skin of the animal in order to comb the insecticide into the skin as it is being discharged through the apertures.

4. In an applicator for treating livestock with powdered insecticide having a tubular dispenser provided with a plurality of apertures disposed in a row along the length of said dispenser for releasing the insecticide, together with a handle associated with said dispenser, the combination of a pair of rollers journaled at opposed ends of said dispenser and a generally channel-shaped member attached along the length of said dispenser having an attachment plate including a row of openings aligned with the apertures on said dispenser and spaced side plates defining a pair of combs extending downwardly from connection with the longitudinal edges of said attachment plate in a direction generally perpendicular to the skin surface of the livestock.

References Cited in the file of this patent

UNITED STATES PATENTS

| 972,690 | Goble | Oct. 11, 1910 |
| 2,529,531 | Abildgaard et al. | Nov. 14, 1950 |
| 2,565,889 | Schroer | Aug. 28, 1951 |
| 2,792,970 | Gaiman | May 21, 1957 |

FOREIGN PATENTS

| 253,608 | Italy | June 27, 1927 |